XR 2,751,449

June 19, 1956 F. KRAHULEC ET AL 2,751,449

TELEVISION KNOB SWITCH

Filed Dec. 19, 1951 3 Sheets-Sheet 1

INVENTORS:
Fred Krahulec
Henry A. Rahmel
BY Mason, Kolehmainen, Rathburn and Wyss
Attorneys INVENTORS:
Fred Krahulec
Henry A Rahmel
BY Mason, Kolehmainen, Rathburn & Wyss
Attorneys INVENTORS:
Fred Krahulec
Henry A Rahmel
BY
Mason, Kolehmainen, Rathburn & Wyss
Attorneys United States Patent Office 2,751,449

Patented June 19, 1956

2,751,449

TELEVISION KNOB SWITCH

Fred Krahulec, Skokie, and Henry A. Rahmel, Evanston, Ill., assignors to A. C. Nielsen Company, Chicago, Ill., a corporation of Illinois Application December 19, 1951, Serial No. 262,374

16 Claims. (Cl. 200—61.85)

The present invention relates to a television knob switch and more particularly to a switch capable of almost universal association with television receiver station selector switches in a manner so as to be completely unnoticeable and yet wherein the switch may control suitable indicating or recording equipment for indicating or recording information relating to the tuning condition of the associated television receiver.

In recent years extensive measurements of the listening habits of wave signal receiver users have been made. These measurements comprise recording minute by minute, or some other suitable time interval, the tuning conditions of such wave signal receivers. Since ordinary broadcast receivers have a reception range which is very great, it was possible to tune in signals from broadcast transmitters located hundreds of miles from the receiver. Moreover, since a very large number of transmitters could be located within an area having a radius of many hundreds of miles it was necessary, in order to get accurate recording, to provide an arrangement whereby a record of the tuning conditions of such receivers could be made with respect to any transmitter within the reception range of the receiver. The various means for obtaining a record from the receiver of the tuning condition thereof have been quite varied. In many setups a mechanical link was employed connected to the tuning shaft of the receiver which was used mechanically to actuate a suitable position switch, the various positions of which were indicative of particular transmitting stations to which the receiver was tuned. Various electrical and electronic means were also employed to obtain from the receiver suitable signals indicative of the tuning condition of the receiver.

Unfortunately where television receivers are involved somewhat different problems exist. In the first place, relatively high voltages are involved and it is desirable to avoid making electrical connections with the television receiver components which electrical connections are brought outside the cabinet of the receiver since personnel might inadvertently be subjected to high voltages. The conventional mechanical links which heretofore had been used for broadcast receivers are difficult to use for the reason that the channel selector shaft of most commercial television receivers is the inner shaft of a pair of concentric control shafts, the outer shaft conventionally controlling suitable trimmer condensors or the like. On the other hand, television receivers are capable of receiving transmitted signals from television transmitters located only at relatively short distances from the receiver. As a result, and as presently contemplated, there will be no locality where it is possible to receive television signals from more than twelve transmitters and consequently most modern television receivers are provided with a channel selector switch capable of being positioned in twelve selective positions. It will be understood that television receivers are manufactured by a large number of different manufacturers and the cabinet designs, including the design of the various tuning knobs and selector switches, are very different, the sets of no two manufacturers being alike. In choosing a sample of television homes for determining the viewing habits of television receiver users, it is necessary for these homes to be representative of the total television viewing audience. Consequently, the homes cannot be chosen so that a particular manufacturer's receiver is always involved, and it is necessary to record the tuning condition of a great variety of different television receivers. It would be desirable to provide an arrangement whereby, with simple means, a mechanical connection could be made with the television channel selector shaft, normally the inner of a pair of concentric shafts, so that actuation of this selector shaft will cause selective operation of a position switch whereby it will be possible to provide an indication or make a record of the tuning condition of the television receiver at all times.

Accordingly, it is an object of the present invention to provide for use with a television receiver a multiple contact switch capable of substantial universal association with all receivers regardless of the manufacturer.

It is another object of the present invention to provide an improved position switch and supporting means therefor for association with television receivers regardless of the type or style of the receiver.

It is a further object of the present invention to provide an improved multiple contact switch capable of being disposed behind the tuning knob of any television receiver and connected for operation with the inner of the two concentric shafts commonly employed with television receivers.

Further objects and advantages of the present invention will become apparent as the following description proceeds and the features of novelty which characterize the invention will be pointed out with particularity in the claims annexed to and forming part of this specification.

For a better understanding of the present invention reference may be had to the accompanying drawings in which Fig. 1 is a somewhat schematic view of a system and apparatus for recording the tuning condition of a television receiver which television receiver is representative of any type of television receiver sold on the market;

Fig. 9 shows the complete structure; Fig. 9 shows the complete structure.

The present invention is concerned with a multiple contact switch which might be termed a "wafer switch" capable of being disposed between the front of a television receiver cabinet and the selector control knob associated with such cabinet or, in some cases, just inside the front cabinet wall, and having suitable control means selectively connected to be operated in response to movement of the channel selector switch shaft which is generally the inner of two concentrically disposed control shafts of a television receiver. The multiple switch is preferably of annular configuration having a plurality of stationary contacts arranged in a circle together with means for selectively connecting or rendering effective different ones of these contacts in response to different tuning positions of the station selector shaft.

Figure 1:
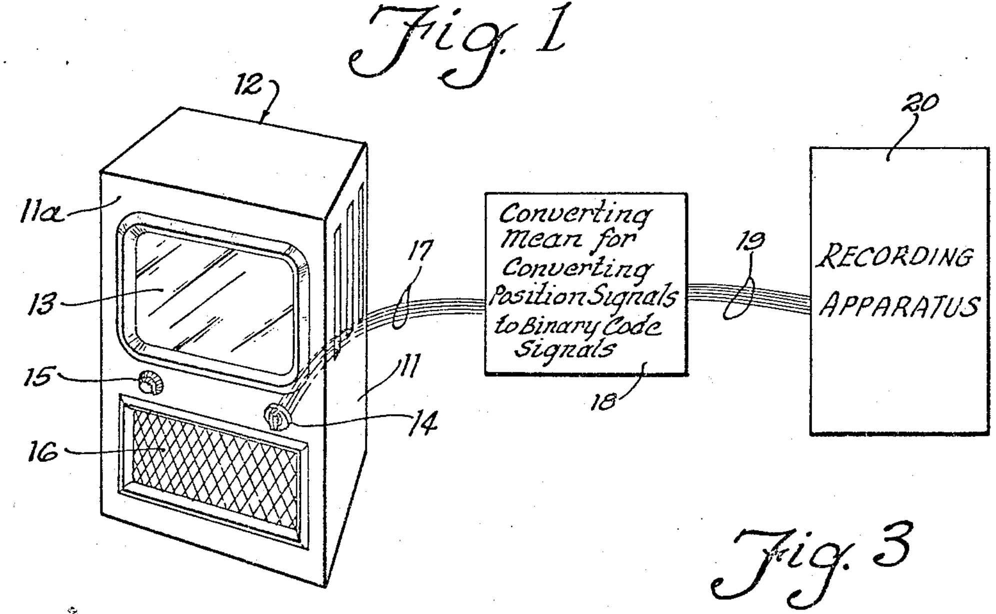

Referring now to Fig. 1 of the drawings, there is illustrated a television receiver generally designated at 12 comprising the conventional receiver cabinet 11 having a front wall 11*a*. Associated with the front wall 11*a* is a conventional cathode ray or picture tube 13, selector switch 14, other control means 15, and loudspeaker 16. As will be described in greater detail hereinafter, there is provided in accordance with the present invention a suitable position switch selectively actuated in response to different tuning positions of the television channel selector and the contacts of this position switch are connected by suitable conductors generally designated at 17, to means 18 for converting position signals to binary code signals. Such converting means 18 may comprise a coding switch as is disclosed in co-pending Krahulec et al. application, Serial No. 147,304 filed March 2, 1950, and assigned to the same assignee as the present application or it may comprise suitable electrical means for similarly converting signals from the position switch to binary code signals. Preferably the binary code signals are supplied through conductors 19 to suitable recording apparatus 20 which may take any suitable form as, for example, the recording apparatus disclosed in co-pending Krahulec application Serial No. 147,302 filed March 2, 1950 and also assigned to the same assignee as the present application.

The present invention is concerned primarily with an improved position switch for readily converting the positions of the channel selector switch of any television receiver to suitable electrical signals.

Figures 2, 3, 4, 6:
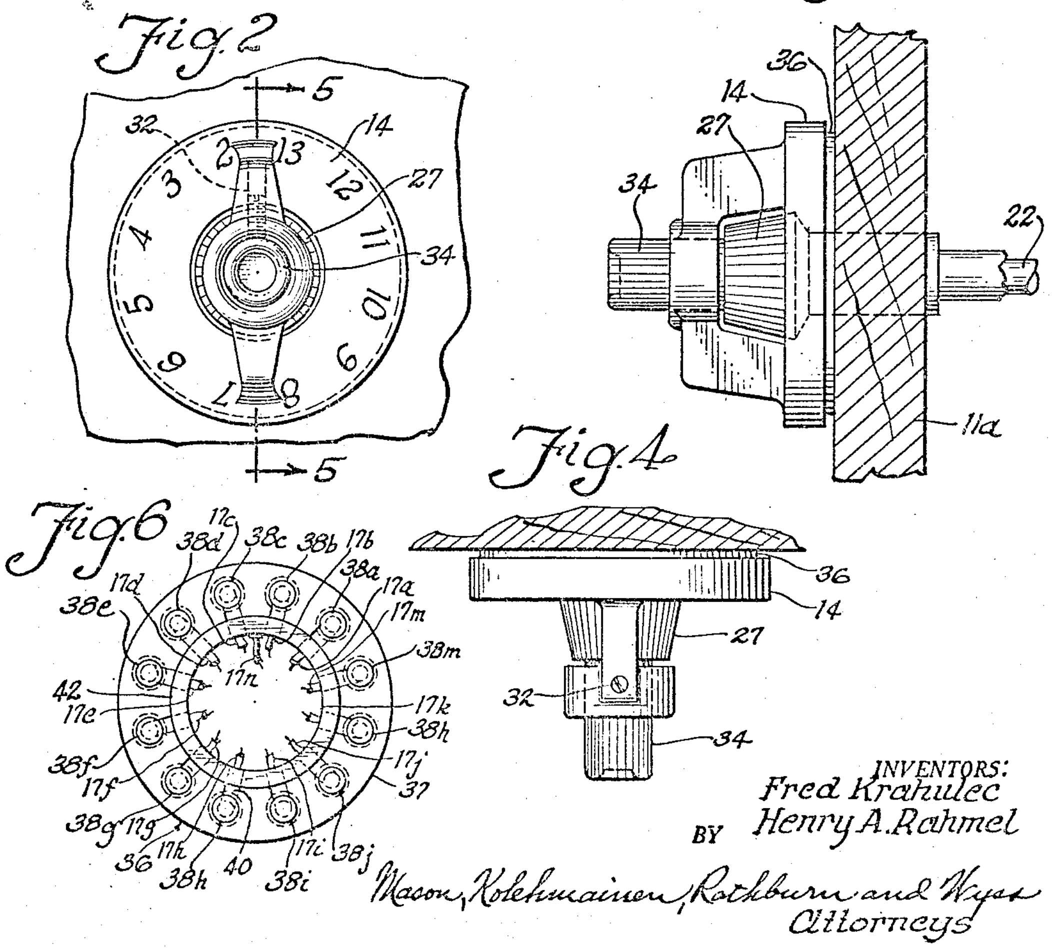
Fig. 2 is an enlarged front view of the selector switch and control knob of the television receiver shown in Fig. 1.
Fig. 3 is an enlarged sectional view taken through the front wall of the cabinet of the receiver of Fig. 1 to illustrate a side elevation of the tuning knob and the concentric shafts associated therewith.
Fig. 4 is a top view of Fig. 3.
Fig. 6 is a front view of one element of the position switch of the present invention clearly shown in Fig. 5.
Figures 5, 7:
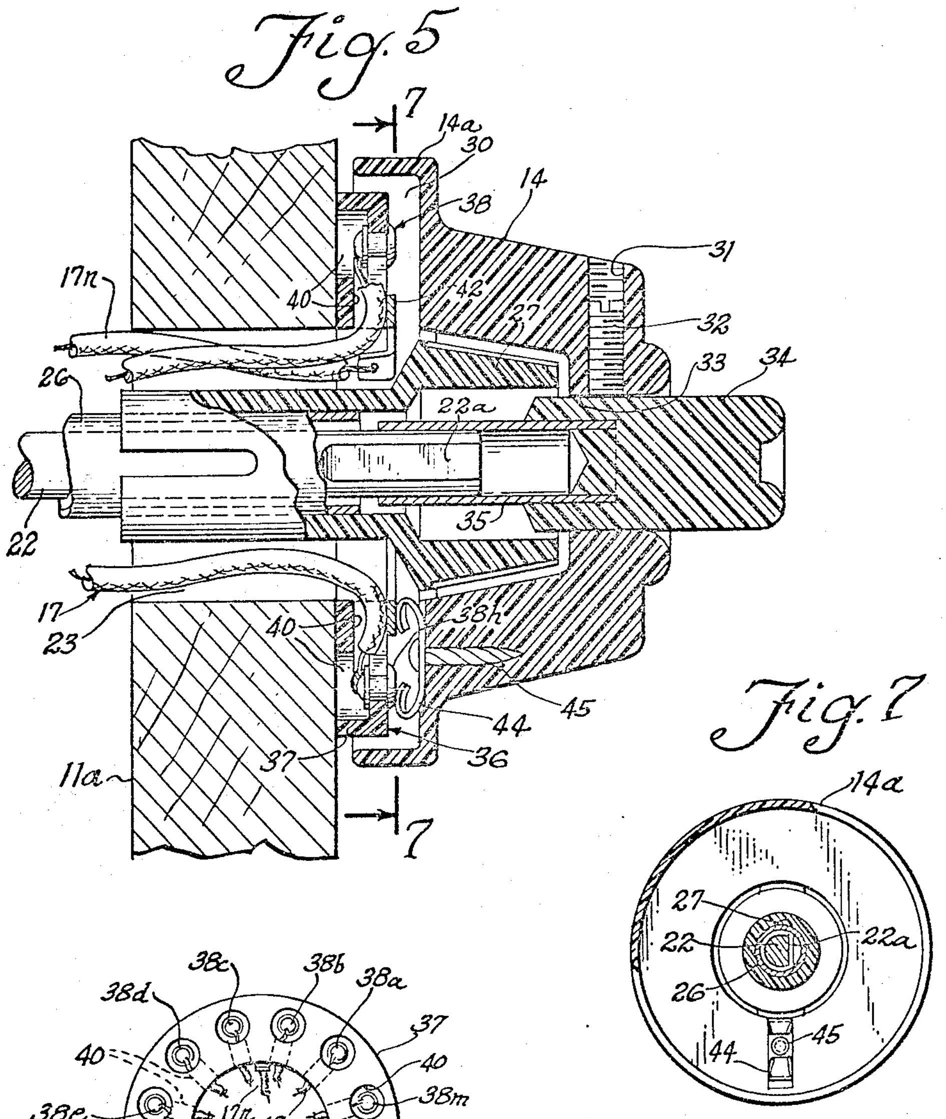
Fig. 5 is an enlarged sectional view taken on line 5—5 of Fig. 2.
Fig. 7 is a sectional view of reduced size taken on line 7—7 of Fig. 5.
Figure 8:
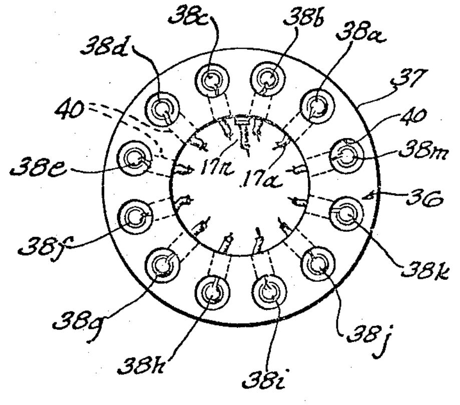
Fig. 8 is a view similar to Fig. 6 of the opposite side of the position switch.

As is best shown in Figs. 2, 3 and 5, the conventional television receiver comprises an inner channel selector shaft 22 which conventionally protrudes through a suitable opening 23 defined in the front cabinet wall 11*a*. Such shaft is conventionally provided with a D-shaped end 22*a* or at least an end having one flat side for ready association with the selector knob 14. Additionally, such television receivers normally include an outer shaft 26 of tubular form concentrically disposed with channel selector shaft 22 which shaft 26 is conventionally connected to control suitable trimmer condensers or the like for fine tuning. The trimmer or outer concentric shaft 26 also protrudes beyond the front cabinet wall 11*a* through a control knob 27 suitably attached thereto as by a pressure fit or the like. In a large number of receivers and as specifically indicated in the drawings, the control knob 27 is a small knob disposed substantially within the conventional tuning knob 14.

In accordance with the present invention the conventional channel selector knob normally supplied with the set is removed from the television receiver with which the recording apparatus for measuring the viewing habits of the television receiver users is associated and a knob 14 of very similar configuration is employed. This knob is in general almost identical with the original channel selector knob but is provided with a peripheral flange 14*a* at the portion of the knob disposed adjacent the front cabinet wall 11*a* so as to define within the peripheral flange a suitable switch chamber 30 which switch chamber is essentially defined by the front cabinet wall and the knob 14. Also the knob 14 is provided with recess 31 for receiving a set screw 32 and a shaft receiving opening 33 for drivingly connecting the knob to suitable means rather than the conventional recess for receiving the end of inner shaft 22.

In order that the knob 14 which must be removed from the front wall of the television cabinet to a sufficient extent to provide the chamber 30 can be drivingly connected to the inner shaft 22, the latter is provided with a suitable shaft extension 34, preferably formed of a molded plastic or the like, having a sleeve insert 35 for driving engagement with the shaft 22. The shaft extension 34 could have the same design for all television receivers and should be of sufficient length to accommodate the various knobs of different receivers. The tuning knob 14 is then suitably attached to the shaft 22 by causing the set screw 32 to engage the extension 34 which extension is effectively a part of the shaft 22. The portion of the shaft extension 34 extending beyond the knob 14 is designed to provide a pleasing appearance and in different installations various lengths of the extension 34 may protrude through the center opening 33 in the knob 14.

In accordance with the present invention, a compact position switch 36 is disposed within the chamber 30 which may have a depth of the order of a ¼ of an inch and a diameter of the order of 2 inches. This position switch comprises a stationary contact support 37 of annular configuration preferably formed of suitable insulating material. Moreover, this stationary support 37 is attached by any suitable means, preferably by a suitable adhesive to the front cabinet wall 11*a* so as to be concentrically disposed with the opening 23. In Fig. 5 the central opening through the annular support 37 is designated as of the same diameter as the opening 23, although it will be understood that this is not essential. Suitably positioned in a circle around the support 37 are a plurality of stationary contacts generally designated as 38 and specifically designated as 38*a*, 38*b*, 38*c*, 38*d*, 38*e*, 38*f*, 38*g*, 38*h*, 38*i*, 38*j*, 38*k* and 38*m*, twelve in all, to correspond with the 12 channel positions of the selector shaft 22. Each of these contacts is connected to a suitable conductor 17, also designated specifically by the corresponding subscript, namely 17*a*, 17*b*, 17*c*, 17*d*, 17*e*, 17*f*, 17*g*, 17*h*, 17*i*, 17*j*, 17*k* and 17*m*. Preferably the switch support 37 is formed of a suitable molded insulating material with the switch contacts 38 molded therein. Additionally, suitable recesses or passageways 40 are included adjacent each contact to permit ready making of electrical connections with the conductor 17 and to provide a passageway for these conductors so they may extend through opening 23 into the television receiver cabinet and out the rear, preferably as a cable suitably insulated from all parts of the receiver so no possibility of bringing out high voltage from the receiver is likely. Also supported on the molded contact support 37 is an annular conducting ring 42 which forms the common contact for all of the contacts 38. This conducting ring is connected to a conductor 17*n* included within the cable comprising the conductors 17. It will be apparent that if a suitable bridging contact connects the common conducting ring 42 with any one of the contacts 38, that a circuit may be completed to provide a suitable control signal. Accordingly, the position switch 36 includes a suitable bridging contact 44 disposed within the chamber 30 and attached to the knob 14 as by any suitable means such as indicated at 45. With this arrangement the bridging contact is directly connected to the knob 14, and if the knob 14 is properly associated with the channel selector shaft 22, a different one of the position switch contacts 38 may be rendered effective for each different position of the channel selector shaft 22. It will be understood that the contacts 38 are spaced exactly as are the different channel positions of the selector shaft 22.

With the above described arrangement, the association of the tuning condition recording apparatus of the present invention with any television receiver will readily be understood. In associating the recording apparatus with such a receiver, the channel selector knob and adjusting knob which come with the receiver are removed. The stationary position switch support 37 is then attached to the cabinet in a manner so that the stationary contacts effectively coincide with the channel positions of the station or channel selector shaft 22. The electrical connections for the position switch are then brought out with the conductors 17 preferably extending through the opening 23 in the front cabinet wall 11*a* and out the rear of the television cabinet. The adjusting knob is then replaced with a similar knob 27 with a longer shank. This is because the knob supplied originally with the cabinet does not usually have a sufficiently long shank to make connection with the outer shaft when the position switch having a thickness of the order of ¼ of an inch is in place. The extension 34 is then applied to the shaft 22, whereupon the knob 14 which is preferably designed to match the particular receiver involved, is attached to the extension 34. The appearance of the front of the receiver is therefore substantially unchanged and yet a fool-proof position switch is incorporated in the small chamber 30 so as to give the desired control signals in dependence upon the channel selector shaft position. It will be apparent that such connections may be made with any receivers by making up a desired knob 14 for any particular cabinet and otherwise using substantially standard parts for all receivers.

Figure 9:
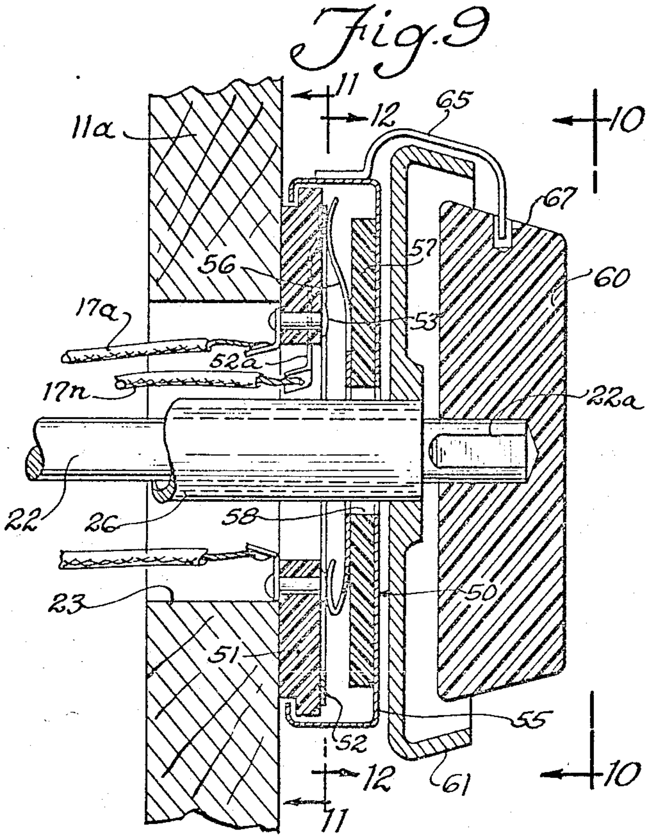
Fig. 9 is a view similar to Fig. 5 illustrating a modification of the invention.
Figure 10:
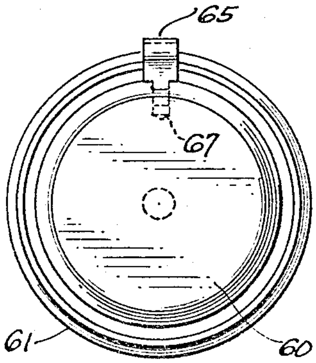
Fig. 10 is a front view of reduced size of the control knobs of Fig. 9.
Figure 12:
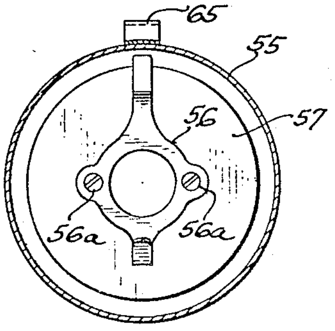
Fig. 12 is a reduced sectional view taken on line 12—12 of Fig. 9 again assuming
Figure 11:
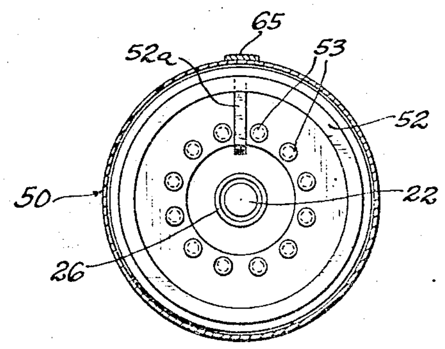
Fig. 11 is a reduced sectional view taken on line 11—11 of Fig. 9 assuming

With the arrangement described above, in general at least one and usually both of the television knobs originally provided with the receiver are replaced. There may be situations where it is desirable to use the existing television knobs and in Figs. 9 to 12 there is illustrated a modification of the present invention in which this is accomplished. The corresponding parts of Figs. 9 to 12 are designated by the same reference numerals as in the preceding embodiments. As illustrated in Figs. 9 and 10, there is provided a position switch generally designated at 50 which comprises a unitary structure including a stationary contact support 51 for supporting the common annular contact ring 52 and a plurality of spaced contacts 53 corresponding at least in function exactly with contacts 38 described above. The contacts 53 are spaced nearest the center of the annular support 51 so connections can readily be made thereto. The ring 52 preferably is brought toward the center by a conductor extension 52*a* which might be molded within the support 51. Conductor 17*n* can then readily be connected to extension 52*a*. The position switch 50 additionally includes a rotatable housing 55 in the form of a cup shaped member partially closed by the stationary contact support 51. This housing is held by suitable means in rotatably supported relationship with respect to support 51. Mounted within the rotary housing 55 is a bridging contact 56 functioning essentially as the bridging contact 44 described above. The housing 55 is preferably of conducting material and consequently the bridging contact is supported by means 56*a* from a suitable insulating support 57, disposed within the cup shaped housing 55 and supported for rotation therewith. The position switch 50 is provided with a central opening 58 so that the switch may be attached to the front of the cabinet, with its opening concentric with the opening 23 in the cabinet wall, thereby to permit the shafts 22 and 26 to protrude through the opening 58 in the rotary position switch. The position switch may be supported from the cabinet front 11*a* by adhesive means or similar supporting means with the stationary contacts 51 positioned to correspond with the various channel positions of the selector shaft 22. The position switch may be attached to the cabinet wall by first removing the channel selector knob 60 and the trimmer condenser knob 61. These knobs are consequently replaced in a manner so as to be slightly farther from the front cabinet wall 11*a* than before the position switch 50 was associated therewith. Since the position switch has a thickness of only about ¼ of an inch, this can normally be accomplished with all receivers on the market today.

For the purpose of drivingly connecting the channel selector knob 60 and the rotatable switch housing 55 to give different position switch indications for each different channel position, there preferably is provided a suitable link 65 attached to the rotatable housing 55 which link is then custom made for each knob style and having its end disposed in a recess defined in the selector knob so as to rotate around the knob 61 without interfering therewith. For example, the link 65 may comprise a length of metal which is bent and cut to the proper length for the particular installation involved. The knob 60 must have a suitable recess 67 cut therein to accommodate the end of the link, or the link 65 may be attached thereto in any suitable manner. In order to be as inconspicuous as possible, the link 65 is preferably made of a transparent plastic and then formed by a suitable heating process to the desired shape necessary for each installation. This forming job may be done by the field man when making the installation or the forming job may be done at the factory, upon the factory being informed of the kind of receiver with which the position switch 50 is to be associated. Although only a single link 65 is shown, it will be readily apparent that a plurality of such links 65, such as three symmetrically arranged, may be used to interconnect the knob 60 or selector shaft and the position switch 50. In any event, with the arrangement shown in Figs. 9 to 12, the position switch can be associated so as to be substantially inconspicuous while employing the original knob equipment, this knob equipment being spaced out from the cabinet by the thickness of the position switch 50.

In view of the detailed description included above, the operation of the arrangement shown in Figs. 9 to 12 will be readily understood. It will, moreover, be apparent that with the present invention, a mechanical connection with the inner channel selector shaft 22 of television receivers wherein the inner shaft is the channel selector shaft can be made in a manner that will be inconspicuous and in no way objected to by the owner of the receiver whose tuning condition it is desired to monitor.

For those television receivers where the channel selector shaft is the outer of the two shafts or only a single shaft, the arrangement of Figs. 9 to 12 is still readily adaptable with the link 65 providing the driving connection. It should be understood that where one or more links 65 are employed as mentioned above, they may be connected to a hub disposed in the opening 23 surrounding shaft 22, which hub is connected to the movable switch portion 55. In such case the switch may be disposed on the inside of the front wall of the television cabinet.

While there have been illustrated and described several embodiments of the present invention, numerous changes and modifications will readily occur to those skilled in the art, and it is desired in the appended claims to cover all such changes and modifications as fall within the true spirit and scope of the present invention.

What is claimed as new and desired to be secured by Letters Paent of the United States is:

1. In a system for determining the viewing and listening habits of television receiver users, a television receiver of the type comprising a pair of coaxially arranged tuning shafts the inner of which is a station selector shaft with separately controllable knobs on the ends of said shafts which protrude outside the cabinet of the television receiver, an annular multiple contact switch, means for supporting said switch from the front of said television cabinet concentric with said shafts, said switch being of such size as to be smaller in diameter than the largest of said knobs, said switch including a plurality of stationary contacts and a cooperating movable contact for selectively engaging said stationary contacts, means of supporting said movable contact for movement relative to said stationary contacts, and means operatively relating said last mentioned means with said inner station selector shaft whereby movement of said inner station selector shaft causes relative movement of said contacts.

2. In a system for determining the viewing and listening habits of television receiver users, a television receiver of the type comprising a pair of coaxially arranged tuning shafts the inner of which is a station selector shaft with said shafts each being provided on the ends which protrude outside the cabinet of the television receiver with separetly controllable knobs, a switch, means for supporting said switch from the front of said television cabinet between said front and said knobs, said switch being of such size as to be disposed behind said knobs whereby when said switch is attached to said cabinet it is effectively hidden by at least one of said knobs, said switch including a plurality of stationary contacts and a cooperating movable contact for selectively engaging said stationary contacts, means of supporting said movable contact for movement relative to said stationary contacts, and means operatively relating said last mentioned means with said inner station selector shaft whereby movement of said inner station selector shaft causes relative movement of said contacts.

3. In a system for determining the viewing and listening habits of television receiver users, a television receiver of the type comprising a pair of coaxially arranged tuning shafts the inner of which is a station selector shaft with said shafts each being provided on the ends which protrude outside the cabinet of the television receiver with separately controllable knobs, an annular multiple contact switch, means for supporting said switch from the front of said television cabinet concentric with said shafts and between said knobs and said cabinet front, said switch being of such size as to be smaller in diameter than the largest of said knobs whereby when said switch is attached to said cabinet it is effectively hidden by at least one of said knobs, said switch including a plurality of stationary contacts and a cooperating movable contact for selectively engaging said stationary contacts, means of supporting said movable contact for movement relative to said stationary contacts, and means operatively relating said last mentioned means with said inner station selector shaft whereby movement of said inner station selector shaft causes relative movement of said contacts.

4. In a system for determining the viewing and listening habits of television receiver users and for use with television receivers of the type comprising a pair of coaxially arranged tuning shafts the inner of which is a station selector shaft with said shafts each being provided on the ends which protrude outside the cabinet of the television receiver with separately controllable knobs, an annular multiple contact switch having a thickness in a direction perpendicular to a diameter of said annular switch not exceeding one-half inch, means for supporting said switch from the front of said television cabinet concentric with said shafts, said switch being of such size as to be smaller in diameter than the largest of said knobs whereby when said switch is attached to said cabinet it is effectively hidden by said largest knob, said switch including a plurality of stationary contacts and a cooperating movable contact for selectively engaging said stationary contacts, means for supporting said movable contact from the knob attached to said station selector shaft, whereby movement of said inner station selector shaft causes relative movement of said contacts.

5. In a system for determining the viewing and listening habits of television receiver users, a television receiver of the type comprising a pair of coaxially arranged tuning shafts the inner of which is a station selector shaft with said shafts each being provided on the ends which protrude outside the cabinet of the television receiver with separately controllable concentrically disposed knobs, an annular multiple contact switch, adhesive means for supporting said switch from the front of said television cabinet concentric with said shafts and behind said knobs, said switch being of such size as to be smaller in diameter than the largest of said knobs whereby when said switch is attached to said cabinet it is effectively hidden by at least one of said knobs, said switch including a plurality of stationary contacts and a cooperating movable contact for selectively engaging said stationary contacts, means of supporting said movable contact for movement relative to said stationary contacts mechanically interconnecting said last mentioned means with said knob attached to said inner station selector shaft whereby movement of said inner station selector shaft causes relative movement of said contacts.

6. In a system for determining the viewing and listening habits of television receiver users, the combination of a television receiver of the type comprising a pair of coaxially arranged tuning shafts the inner of which is a station selector shaft with said shafts each being provided on the ends which protrude outside the cabinet of the television receiver with separately controllable knobs, an annular multiple contact wafer switch, means for supporting said switch from the front of said television cabinet concentric with said shafts and between said knobs and said cabinet front, said switch being of such size as to be smaller in diameter than the largest of said knobs whereby when said switch is attached to said cabinet it is effectively hidden by at least one of said knobs, said switch including a plurality of stationary contacts and a cooperating movable contact for selectively engaging said stationary contacts, means of supporting said movable contact for movement relative to said stationary contact, and means operatively relating said last mentioned means with said inner station selector shaft whereby movement of said inner station selector shaft causes relative movement of said contacts.

7. In a system for determining the viewing and listening habits of television receiver users, the combination of a television receiver of the type comprising a pair of coaxially arranged tuning shafts the inner of which is a station selector shaft with said shafts each being provided on the ends which protrude outside the cabinet of the television receiver with separately controllable knobs, an annular multiple contact wafer switch, means for adhesively supporting said switch from the front of said television cabinet concentric with said shafts and between said knobs and said cabinet front, said switch being of such size as to be smaller in diameter than the largest of said knobs whereby when said switch is attached to said cabinet it is effectively hidden by at least one of said knobs, said switch including a plurality of stationary contacts and a cooperating movable contact for selectively engaging said stationary contacts, and means of supporting said movable contact from said knob attached to said station selector shaft whereby movement of said inner station selector shaft causes relative movement of said contacts.

8. In a system for determining the viewing and listening habits of television receiver users, the combination of a television receiver of the type comprising a pair of coaxially arranged tuning shafts the inner of which is a station selector shaft with said shafts each being provided on the ends which protrude outside the cabinet of the television receiver with separately controllable knobs, an annular multiple contact wafer switch, means for supporting said switch from the front of said television cabinet concentric with said shafts and between said knobs and said cabinet front, said switch being of such size as to be smaller in diameter than the largest of said knobs whereby when said switch is attached to said cabinet it is effectively hidden by at least one of said knobs, said switch comprising a stationary insulating support having mounted thereon a plurality of stationary contacts arranged around the axis of said selector shaft in the manner of the channel position of said shaft, a cooperating movable contact for selectively engaging said stationary contacts, means including a part of said switch for supporting said movable contact for movement relative to said stationary contacts and positioned for selective engagement thereof, and an extension of said last mentioned means for physically connecting said knob on said station selector shaft with said last mentioned means whereby movement of said inner station selector shaft causes relative movement of said contacts.

9. In a system for recording the tuning condition of a television receiver and for use with television receivers of the type comprising a pair of coaxially arranged tuning shafts the inner of which is a station selector shaft with said shafts each being provided on the ends which protrude outside the front of the cabinet of the television receiver with separately controllable knobs, a switch, means for positioning said switch between said cabinet front and said knobs, said switch being of such size as to be disposed behind said knobs whereby when said switch is in position it is effectively hidden by at least one of said knobs, said switch including an insulating support capable of being pasted to said cabinet front and a plurality of stationary contacts arranged about said support, said switch also including a cooperating movable contact for selectively engaging said stationary contacts, means for supporting said movable contact for movement relative to said stationary contacts, and a narrow strip extending between said last mentioned means and the knob connected to said inner station selector shaft whereby movement of said inner station selector shaft causes relative movement of said contacts.

10. In a system for recording the tuning condition of a television receiver and for use with television receivers of the type comprising a pair of coaxially arranged tuning shafts the inner of which is a station selector shaft with said shafts each being provided on the ends which protrude outside the front of the cabinet of the television receiver with separately controllable knobs, a switch, means for positioning said switch between said cabinet front and said knobs, said switching being of such size as to be disposed behind said knobs whereby when said switch is in position it is effectively hidden by at least one of said knobs, said switch including an annular insulating support capable of being pasted to said cabinet front and a plurality of stationary contacts arranged about said support, said switch also including a cooperating movable contact for selectively engaging said stationary contacts, means for supporting said movable contact for movement relative to said stationary contacts comprising a housing for said switch, and means extending between said housing and the knob connected to said inner station selector shaft and drivingly interconnecting the same whereby movement of said inner station selector shaft causes relative movement of said contacts.

11. In a system for recording the tuning condition of a television receiver and for use with television receivers of the type comprising a pair of coaxially arranged tuning shafts the inner of which is a station selector shaft with said shafts each being provided on the ends which protrude outside the front of the cabinet of the television receiver with separately controllable knobs, a switch, means for positioning said switch between said cabinet front and said knobs, said switch being of such size as to be disposed behind said knobs whereby when said switch is in position it is effectively hidden by at least one of said knobs, said switch including an annular insulating support capable of being fastened to said cabinet front and a plurality of equally spaced stationary contacts arranged in a circle about said support, said switch also including a cooperating movable contact for selectively engaging said stationary contacts, the knob connected to said inner station selector shaft having a recess for receiving said switch therein, and means for supporting said moveable contact on said last mentioned knob within said recess for selective engagement with said stationary contacts.

12. In a system for determining the viewing and listening habits of television receiver users, a television receiver of the type comprising a station selector shaft with a control knob on the end of said shaft which protrudes outside the cabinet of the television receiver, an annular multiple contact switch, means for supporting said switch concentric with said shaft, said switch being of such size as to be smaller in diameter than said knob, said switch including a plurality of stationary contacts and a cooperating movable contact for selectively engaging said stationary contacts, means of supporting said movable contact for movement relative to said stationary contacts, and means operatively relating said last mentioned means with said station selector shaft whereby movement of said station selector shaft causes relative movement of said contacts.

13. In a system for determining the viewing and listening habits of television receiver users and for use with television receivers of the type comprising a station selector shaft provided on the end which protrudes outside the cabinet of the television receiver with a control knob, a switch, means for supporting said switch from the front of said television cabinet between said front and said knob, said switch being of such size as to be disposed behind said knob whereby when said switch is attached to said cabinet it is effectively hidden by said knob, said switch including a plurality of stationary contacts and a cooperating movable contact for selectively engaging said stationary contacts, means of supporting said movable contact for movement relative to said stationary contacts, and means operatively relating said last mentioned means with said station selector shaft whereby movement of said station selector shaft causes relative movement of said contacts.

14. In a system for recording the tuning condition of a television receiver, a television receiver of the type comprising a station selector shaft provided on the end which protrudes outside the front of the cabinet of the television receiver with a control knob, a switch, means for positioning said switch between said cabinet front and said knob, said switch being of such size as to be disposed behind said knob whereby when said switch is in position it is effectively hidden by said knob, said switch including an annular insulating support capable of being fastened to said cabinet front and a plurality of stationary contacts arranged about said support, said switch also including a cooperating movable contact for selectively engaging said stationary contacts, means for supporting said movable contact for movement relative to said stationary contacts, and a narrow strip extending between said last mentioned means and said knob whereby movement of said inner station selector shaft causes relative movement of said contacts.

15. In a system for determining the viewing and listening habits of television receiver users, a television receiver of the type comprising a station selector shaft with a control knob on the end of said shaft which protrudes outside the cabinet of the television receiver, a rotary multiple contact switch, means for supporting said switch from the front wall of said television cabinet concentric with said shaft and disposed to the rear of said knob when viewed from the front of said cabinet, said switch including a plurality of spaced contacts stationary relative to one another and a cooperating contact for selectively engaging said spaced contacts, means of supporting said cooperating contact and said spaced contacts for relative movement, and means operatively relating said last mentioned means with said station selector shaft whereby movement of said station selector shaft causes relative movement between said spaced and cooperating contacts.

16. In a system for recording the tuning condition of a television receiver and for use with television receivers of the type comprising a pair of coaxially arranged tuning shafts one of which is a station selector shaft with said shafts each being provided on the ends which protrude outside the front of the cabinet of the television receiver with separately controllable knobs one disposed in front of the other, a switch, means for positioning said switch between said cabinet front and said knobs, said switch including an insulating support element and a plurality of spaced contacts arranged about said support and fixed relative to said support, said switch also including a cooperating contact element for selectively engaging said spaced contacts, means for supporting one of said elements from said cabinet front, and connecting means connecting the other of said elements with the outermost of said knobs and extending around the other of said knobs so as to cause relative movement between said cooperating contact element and said spaced contacts when said outermost knob is rotated without interfering with free movement of said other knob.

References Cited in the file of this patent

UNITED STATES PATENTS

| | | |
|---|---|---|
| 1,887,312 | Krueger | Nov. 8, 1932 |
| 2,028,626 | Schleicher et al. | Jan. 21, 1936 |
| 2,157,584 | Woodruff | May 9, 1939 |
| 2,210,380 | Potter | Aug. 6, 1940 |
| 2,570,209 | Cotsworth | Oct. 9, 1951 |
| 2,570,960 | Lutsky et al. | Oct. 9, 1951 |